Aug. 12, 1924.

B. M. SHIPLEY 1,504,277

CASH REGISTER

Filed Dec. 19, 1919     6 Sheets-Sheet 1

Inventor
BERNIS M. SHIPLEY
by Earl Beust
Henry E Stauffer
Attorney

Aug. 12, 1924.
B. M. SHIPLEY
1,504,277
CASH REGISTER
Filed Dec. 19, 1919  6 Sheets-Sheet 2
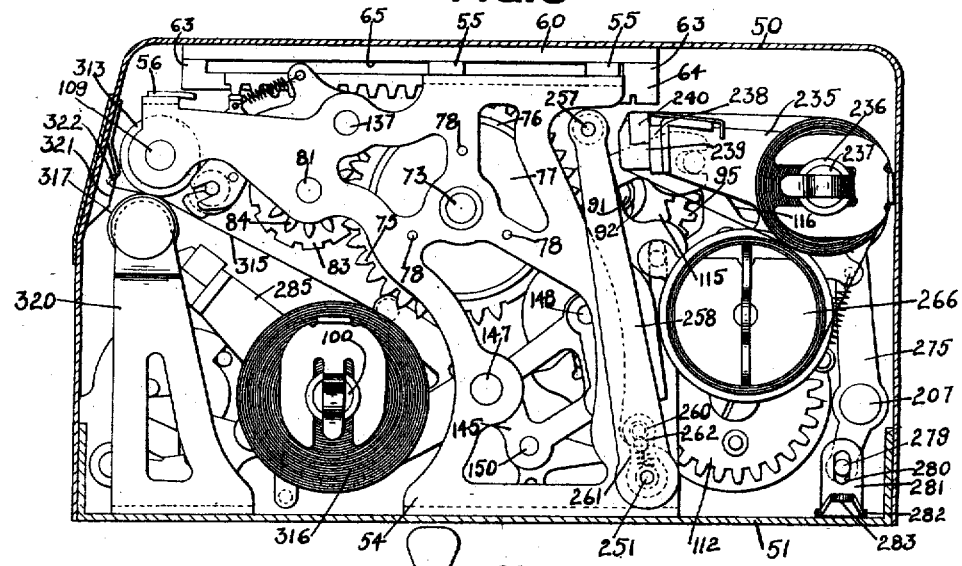
FIG. 3
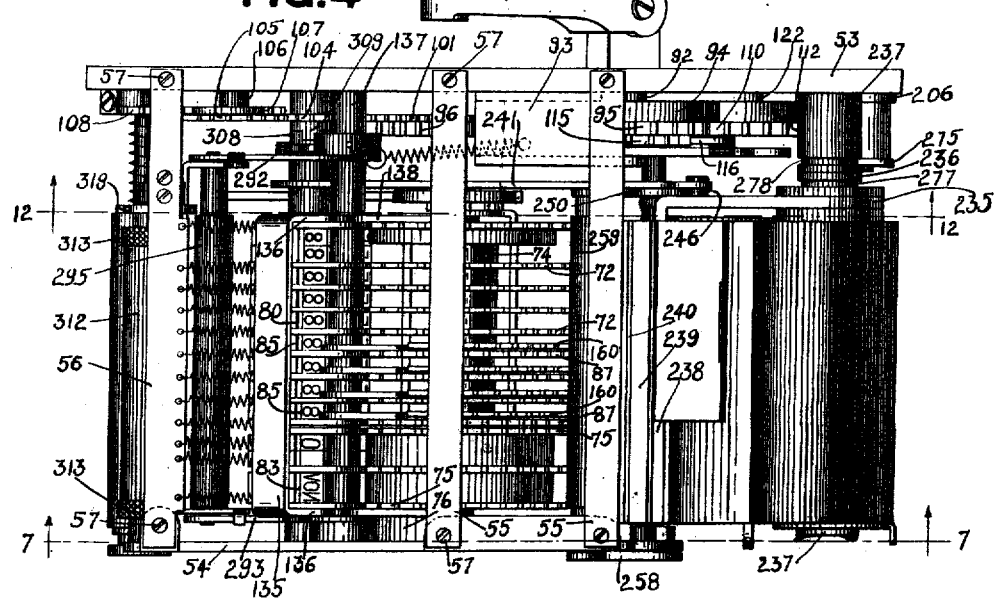
FIG. 4
FIG. 5
FIG. 6
Inventor
BERNIS M. SHIPLEY
by Earl Bent
Henry E. Stauffer
Attorney Aug. 12, 1924.  1,504,277
B. M. SHIPLEY
CASH REGISTER
Filed Dec. 19, 1919    6 Sheets-Sheet 3
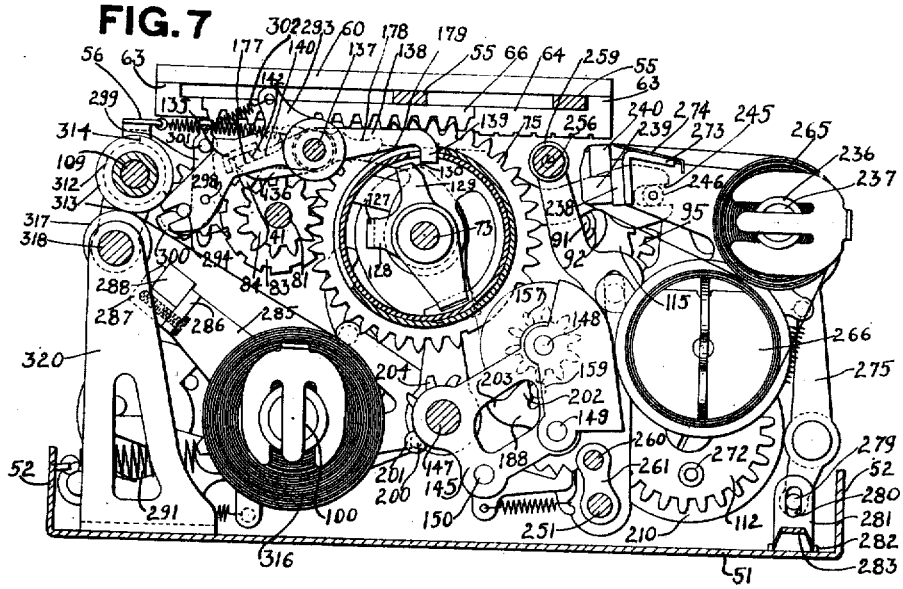
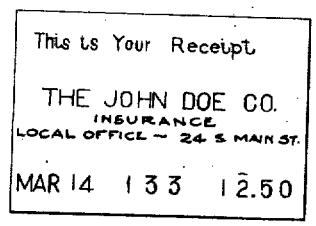
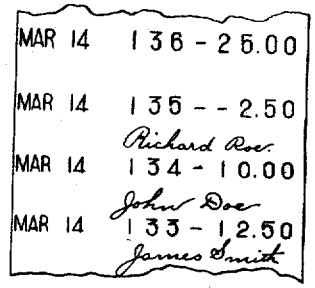
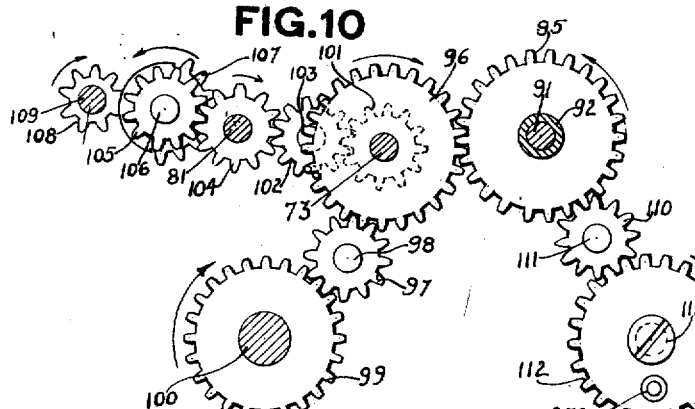
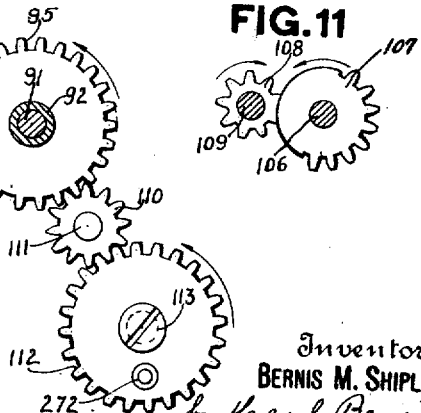

Aug. 12, 1924.

B. M. SHIPLEY 1,504,277

CASH REGISTER

Filed Dec. 19, 1919   6 Sheets-Sheet 4

Inventor
BERNIS M. SHIPLEY
Attorneys

Aug. 12, 1924. 1,504,277
B. M. SHIPLEY
CASH REGISTER
Filed Dec. 19, 1919 6 Sheets-Sheet 5
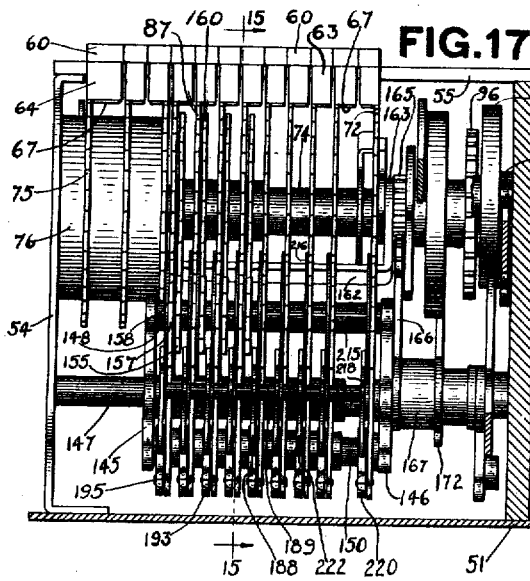
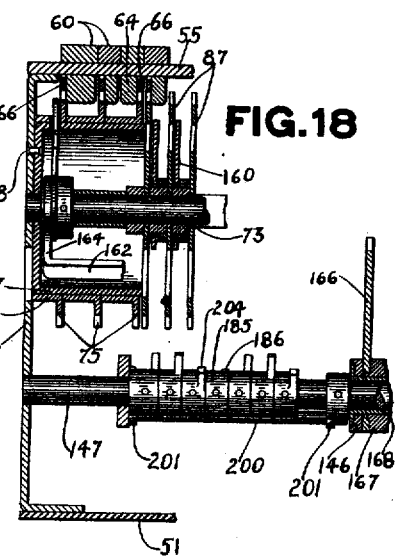
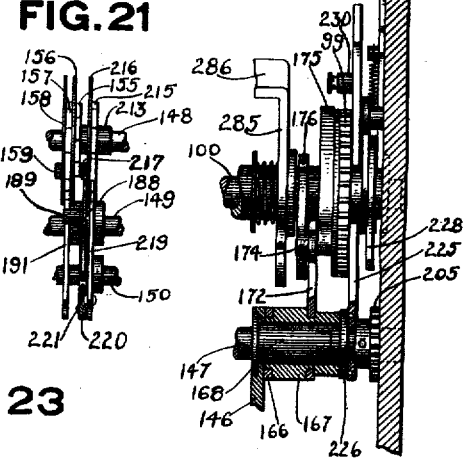
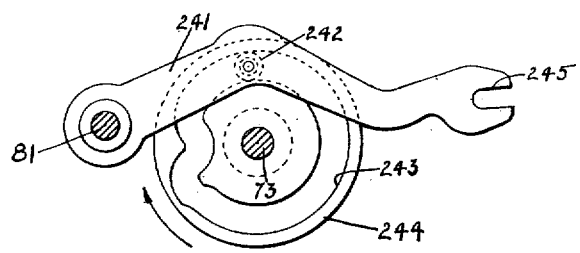
Inventor
BERNIS M. SHIPLEY
by Earl Benst
Henry E Stauffer
Attorneys Aug. 12, 1924.

B. M. SHIPLEY 1,504,277

CASH REGISTER

Filed Dec. 19, 1919    6 Sheets-Sheet 6

Inventor
BERNIS M. SHIPLEY

Patented Aug. 12, 1924.

1,504,277

UNITED STATES PATENT OFFICE.

BERNIS M. SHIPLEY, OF DAYTON, OHIO, ASSIGNOR TO THE NATIONAL CASH REGISTER COMPANY, OF DAYTON, OHIO.

CASH REGISTER.

Application filed December 19, 1919. Serial No. 346,134.

*To all whom it may concern:*

Be it known that I, BERNIS M. SHIPLEY, a citizen of the United States, residing at Dayton, in the county of Montgomery and State of Ohio, have invented certain new and useful Improvements in Cash Registers, of which I declare the following to be a full, clear, and exact description.

This invention relates to improvements in cash registers and the like, the primary object being to devise a mechanism that is adapted to be transported from place to place by the operator thereby making it adaptable for use among insurance collectors, ice men, milk men, express men, etc.

The machine herein disclosed is designed to issue checks or receipts and print upon a record strip, commensurate with the amount set up by the operator. This amount is also accumulated upon a totalizer adapted to receive such amounts.

The present invention is an improvement over a former machine invented by Frederick L. Fuller and disclosed in Letters Patent of the United States, No. 1,336,693, dated April 13, 1920.

The main object of this invention is to provide a machine of the type mentioned with a consecutive numbering device which is advanced "1" each operation of the machine.

Another object of the present improvement is to provide means whereby the number on the consecutive counter is transferred therefrom to a rotary printer and to a recipocating printer so that said number is printed upon a check or receipt and also upon the record strip.

Means is also provided for clearing the consecutive counter simultaneously with the clearing of the totalizer.

The machine is so designed that by omitting certain elements and by a mechanical substitution of other parts said machine is made adaptable for manually feeding a slip or other papers into the machine and printing thereon commensurate with the amount set up by the operator.

The modification of the machine herein disclosed differs from the former machine disclosed in the above mentioned Fuller patent in that, in the present machine the slip or inserted paper may be printed upon several times before being removed, whereas in the former machine only one print can be made upon the inserted paper.

With these and incidental objects in view, the invention consists in certain novel features of construction and combinations of parts, the essential elements of which are set forth in the appended claims, and a preferred form of embodiment of which is hereinafter described with reference to the drawings which accompany and form part of the specification.

Of said drawings:

Fig. 3 is a full size side elevation of the improved registering mechanism, the cabinet and part of the framework therefor being shown in section.

Fig. 4 is a top plan view of the improved registering mechanism, the settable slides and cabinet therefor being removed.

Fig. 5 is a detailed view in side elevation of one of the amount settable slides.

Fig. 6 is a vertical sectional view taken on the line 6—6 of Fig. 5, looking in the direction indicated by the arrows.

Fig. 7 is a vertical sectional view taken on line 7—7 of Fig. 4, looking in the direction indicated by the arrows.

Fig. 8 is a full size view illustrating a sample of the check issued by the machine.

Fig. 9 is a detail view illustrating a portion of the record strip as printed by the machine.

Fig. 10 is a detail view illustrating the driving mechanism for the various elements of the machine.

Fig. 11 is a detail view of the mutilated gears for feeding the check.

Fig. 17 is an end elevation illustrating the consecutive counter, the totalizer, the actuating elements therefor, and also the actuating elements for setting the date.

Fig. 18 is a sectional view illustrating the actuating elements for setting the date, part of the consecutive counter actuating elements and also shows the transfer cam line for the totalizer and consecutive counter.

Fig. 19 is a detail view illustrating a consecutive counter wheel and its actuating element.

Fig. 20 is a detail view of the higher order totalizer disk and the stop pawl therefor and also illustrates the means which operates said pawl for actuating the lower order element of the consecutive counter.

Fig. 21 is an end elevation of the mechanism illustrated in Fig. 20, with the stop pawl operating means removed and the lower order consecutive counter element added.

Fig. 22 is a view partly in horizontal section and partly in top plan, illustrating the construction of the transfer cam shaft and the driving cams for the consecutive counter clearing device.

Fig. 23 is a detail view illustrating the cam and arm for feeding the detail strip.

Described in general terms the machine comprises a series of manually operated settable slides whereby the date and the amount of the transaction may be transferred to a printing mechanism for printing upon a check and a detail strip. A totalizer is also provided for accumulating thereupon the same amounts which have been set upon the printing mechanism.

A consecutive counter is also provided which has elements cooperating therewith for transferring the number from said consecutive counter upon a plurality of printing devices whereby said number may be printed upon a check and the detail strip.

There are two impression mechanisms, one cooperating with the check printer and one cooperating with the detail printer. Means is also provided whereby autographic notations may be made upon the detail strip before each operation of the machine if so desired.

As previously stated the machine is adapted for use by collectors of various businesses and therefore the totalizer and the consecutive counter are arranged so that they cannot be reset by the collector having the machine in charge. Means is provided for resetting the totalizer and also the consecutive counter which is under the control of a key which may be kept in the office of the business or by the proprietor thereof so that the totalizer and consecutive counter can only be reset by the person authorized to do so or in other words the one who has charge of the key for operating the controlling elements for resetting said totalizer and the consecutive counter. This arrangement gives the proprietor absolute check on all money taken in by the collectors.

Figure 1:
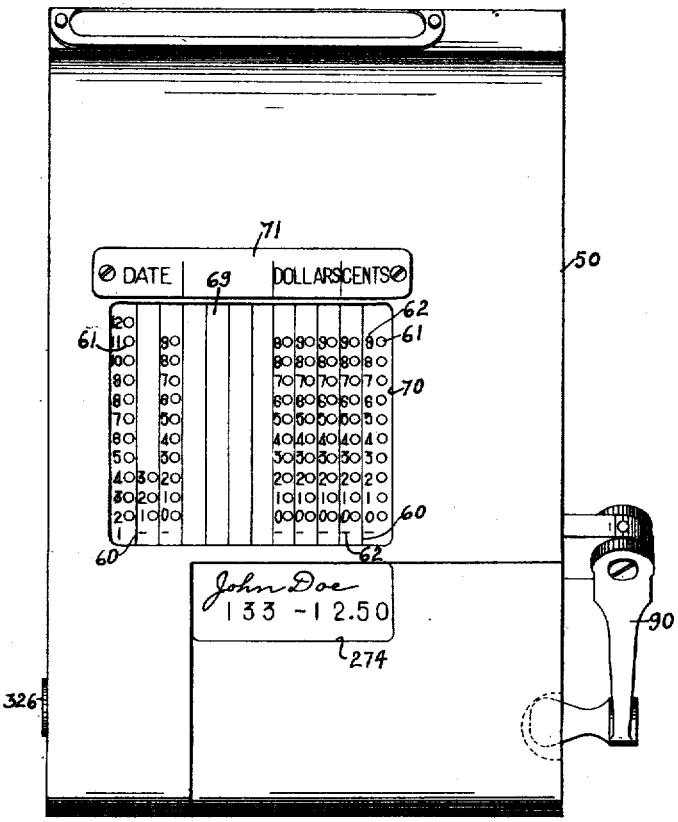
Figs. 1 and 2 are full size views illustrating in top plan and front elevation respectively, the improved registering mechanism.
Figure 2:
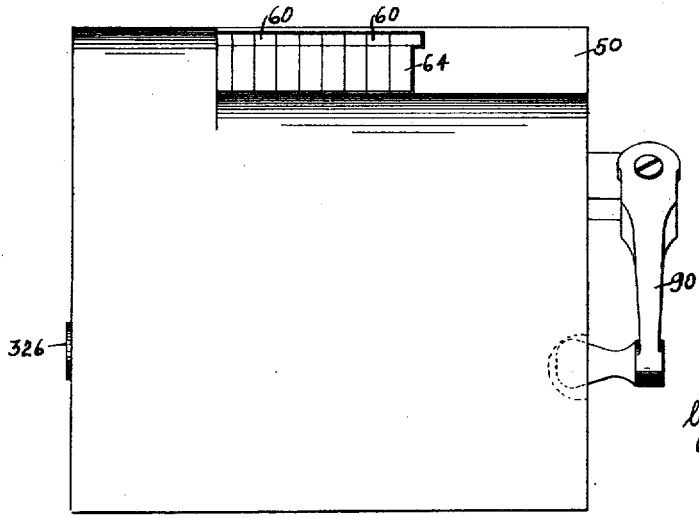

With reference to the drawings and in which like reference numerals refer to similar parts throughout the various figures the mechanism will be described in detail. Referring to Figs. 1, 2 and 3 it will be seen that the mechanism is enclosed in a suitable casing or cabinet 50. The various operating elements are supported in a framework which comprises a horizontal base 51 having both ends extended vertically at 52, a vertical frame 53 and a vertically extending bracket 54 secured to the base by any suitable means. The bracket 54 and the frame 53 are tied across the top by means of two bars 55 and a bar 56 secured to said frame and bracket by means of screws 57 (Figs. 3 and 4).

Setting mechanism.

The settable slides for positioning type for printing amounts and the date upon the detail strip and for positioning actuators for setting up the amounts and the date upon the type wheels and for accumulating upon the totalizer will now be described. There are five manually operated settable slides for the amounts and three for the date, as illustrated in Fig. 1. Each slide comprises a plate 60 (Figs. 1 and 5) provided in its upper surface with holes 61 adjacent which are inscribed characters 62 representing amounts and the date, as is clearly shown in Fig. 1. The plate 60 is secured to projections 63 on a bar 64 thus forming a slideway 65 through which pass the tie bars 55, said bars acting as supporting means for the slidable members. Secured in a groove in the side of the bar 64 is a rack 66 which meshes with actuating means for the totalizer and the type wheels, and will be hereinafter described. A portion of the underside of the bar 64 is provided with type 67 bearing characters commensurate with the inscription 62 above described, and which are for the purpose of printing upon a detail strip, to be later described. The plate 60, and the characters thereon, are visable through an opening 70 made in the top of the cabinet 50. Above the opening 70 and secured to the top of the cabinet 50 is a plate having the designations "Date" above the date slides and "Dollars" and "Cents" above the amount slides.

In order to set up an amount the operator uses any suitable operating element such as a pencil or stylus and inserts it in the holes 61 opposite the desired figure and moves the plate 60 forward until stopped by engagement of the operating element with the edge of the opening 70. The date is set in a like manner by moving the "Date" plates forward to the desired position. The operation of moving the plates 60 to set up the amounts and also to set the date thereby positions the type 67 for printing upon the detail strip, to be hereinafter described.

Figure 16:
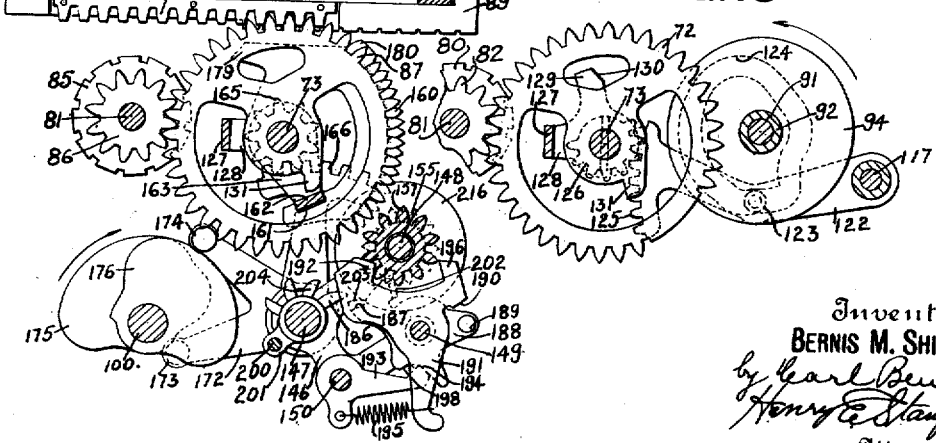
Fig. 16 is a detail view illustrating the restoring device for the actuators and settable slides.

The actuating means for transferring the amounts and the date upon the type wheels will now be described. The actuating means for the amount slides will be taken up first and comprises five gears 72 (Figs. 16 and 17) loosely mounted upon a shaft 73, carried by the frame 53 and the bracket 54, and spaced laterally thereon by their respective hubs 74. Each of these gears meshes with one of the racks 66 secured to the five amount settable slides.

The actuating mechanism cooperating with the date slides comprises three gears 75 meshing with the racks 66 secured to said slides. These gears are each provided with a hub 76 and are mounted upon a stationary drum 77 secured to the bracket 54 by rivets 78 (Figs. 3 and 18).

There are five amount type wheels 80 loosely mounted upon a shaft 81 each wheel having secured to the side thereof a pinion 82 each meshing with one of the gears 72. There are three date type wheels 83 each having secured to the side thereof a pinion 84 each meshing with one of the gears 75.

From the above description it will be clear that when the plates 60 are moved to set the date and the amount, that through the gears 72 and 75 the type wheels 80 and 83 will be directly positioned to print the amount and the date, respectively, upon a check, which will be hereinafter described.

*Operating mechanism.*

The mechanism which drives the various elements of the machine comprises, an operating handle 90 of the usual type, such as described in the above mentioned Fuller patent. The operating handle has a reduced portion forming a stud 91 (shown in cross section in Figs. 10 and 16) which enters a hub 92, rotatably mounted in the frame 53 and a bracket 93 carried by the frame 53, and is connected thereto by means of a mortice and tenon (not shown). The handle 90 is held in place by any suitable means such as a plunger and spring (not shown) which cooperates with a V shaped notch (not shown) formed in the stud 91. In Figs. 1 and 2 the handle is shown folded in, and in Fig. 4 it is shown opened out for operating. Secured to the hub 92 is a disk 94 having secured to the side thereof a gear 95 which meshes with a gear 96 loose upon the shaft 73. The gear 96 meshes with a pinion 97 loose upon a stud 98 carried by the frame 53. This pinion 97 meshes with a gear 99 loose upon a stud 100 carried by the frame 53. Secured to the side of the gear 96 is a pinion 101 meshing with another pinion 102 loose on a stud 103 carried by the frame 53. The pinion 102 meshes with a gear 104 loose on the shaft 81, and said gear in turn meshes with a gear 105 loose on a stud 106 carried by the frame 53. The gear 105 has secured to the side thereof a mutilated gear 107 which cooperates with a multilated pinion 108 fast upon a shaft 109 rotatably mounted in the frame 53 and the bracket 54. The gear 95 also meshes with a pinion 110 loose on a stud 111 carried by the frame 53, said pinion in turn meshing with a gear 112 loose on a stud 113 carried by the frame 53.

From the above description it will be clear that by giving the handle 90 one revolution in the operative direction that the stud 91, hub 92 and gear 95 (Fig. 10) will be rotated in a counter-clockwise direction. Upon rotation of the gear 95 in a counter-clockwise direction it will also be clear that the gears and pinions shown in Fig. 10 will be rotated in the direction indicated by the arrows. The shaft 109 also receives a clockwise revolution during each operation of the machine.

Due to a full stroke device the handle 90 can be turned only in one direction to operate the train of gears illustrated in Fig. 10. This full stroke device comprises, a snail ratchet 115 (Figs. 4 and 12) secured to the side of the gear 95. Cooperating with the ratchet 115 is a pawl 116 pivotally mounted upon a stud 117 carried by the frame 53 and held in normal position by a spring 118 stretched between the right hand end of the pawl and a stud carried by the frame 53. A portion 119 of the pawl 116 normally engages a pin 120 projecting laterally from the ratchet 115. To operate the handle 90 it is given a slight movement backward or in the inoperative direction thereby releasing the portion 119 of the pawl 116 from the pin 120 which allows the spring 118 to rock the pawl counter-clockwise so that a portion 121 of the pawl will engage the lowest portion of the periphery of the ratchet 115. The handle 90 is now turned in an operative direction and as the ratchet 115 is rotated counter-clockwise (Fig. 12) the pawl 116 will be gradually rocked in a clockwise direction until the pin 120 again engages the portion 119 of the pawl thereby stopping the ratchet and consequently the handle from further operation and allowing the spring 118 to restore the pawl to its normal position, shown in Fig. 12. From the above description it is obvious that after the handle has once been started in the operative direction the operation must be completed as the handle cannot be moved backward due to the engagement of the portion 121 of the pawl 116 with the teeth on the ratchet 115.

*Restoring and aligning device.*

The mechanism for aligning the type wheels and holding the settable slides in position after they have been set for printing, for restoring said type wheels and settable slides to their normal or home position so that they will be ready for a subsequent operation of the machine, for accumulating the amount upon a totalizer, to be hereinafter described, and also for advancing the consecutive counter, to be hereinafter described, comprises a lever 122 (Figs. 4 and 16) loosely mounted on the stud 117. The lever 122 carries an anti-friction roller 123 which cooperates with a cam race 124 formed in the side of the disk 94. The end of the lever 122 is provided with teeth 125 which mesh with a pinion 126 fixed to the shaft 73. A bail 127 is carried by parallel arms 128 fast upon the shaft 73. Each arm 128 has integral therewith an upwardly extending portion 129 beveled at 130, the purpose of which will hereinafter be described. The gears 72 and 75, which it will be remembered are positioned by the settable slides, are provided near their centers with downwardly extending portions 131 which cooperate with the bail 127.

The aligning device comprises a bail 135 (Figs. 4 and 7) carried by parallel arms 136 loosely mounted upon the shaft 137 carried by the frame 53 and the bracket 54. The arms 136 have integral therewith arms 138 provided with downwardly extending portions 139 which cooperate with the portions 129 of the arms 128.

Cooperating with each of the gears 82, 84 and 86, which it will be remembered are secured to the sides of the type wheels, is a spring pressed pawl 140 (Fig. 7) loosely mounted upon the shaft 137 and held by its springs so that a nose 141 formed thereon is in engagement with its associated gear. Each of the pawls has another nose 142 formed just above the nose 141 which contacts with the lower surface of the bail 135.

During the setting of the type wheels 80 and 83, by the manipulation of the settable slides, the pawls 140 and the bail 135 will be rocked up and down as the gears on the type wheels pass over the noses 141 of the pawls 140. The rocking of the bail 135 by the engagement of the pawls 140 therewith causes the nose 139 of each of the levers 138 to be rocked up and down, and therefore the upwardly extending portions 129 of the arms 128 are cut away or beveled off at 130, as previously described, to allow clearance for the downward movement of the nose 139.

From the above description it will be clear that when the disk 94 (Fig. 16) is rotated counter-clockwise that through the cam race 124 and roller 123 the lever 122 will be first rocked slightly in a counter-clockwise direction, which movement rotates the pinion 126 and consequently the shaft 73 slightly in a clockwise direction. The arms 128 being secured to the shaft 73 also receive said clockwise movement which is sufficient to position the upwardly extending portions 129 of the arms 128 directly beneath the noses 139 of the levers 138, thereby preventing oscillation of said levers and also the bail 135 and the pawls 140 which locks the type wheels and consequently the actuating gears 72 and 75 cooperating therewith and prevents further manipulation of the settable slides after the handle 90 has been started to drive the operating elements.

At the proper time and after the printing has taken place, which will be later described, the lever 122 (Fig. 16) is rocked in a clockwise direction thereby causing the shaft 73 to be rocked in a counter-clockwise direction. During the setting operation, as previously described, it will be remembered that the gears 72 are rotated in a clockwise direction and are differentially positioned, and therefore the projecting portions 131 thereof will be differentially positioned. The shaft 73 being given a counter-clockwise rotation it will also rotate the bail 127, it being fast thereto, thereby causing said bail to engage the differentially set portion 131 of the gears 72 and rotate said gears to their home or normal position. This movement of the gears through their engagement with the racks 66 on the settable slides restores said slides to their normal or home position. The gears 75 (Figs. 7 and 17) which cooperate with the date slides and the date type wheels are not provided with any portion 131 thereon to cooperate with the bail 127. As previously described these gears 75 are mounted upon the stationary hollow drum 77 and are not restored to normal position by the bail 127, said bail operates inside of the drum 77.

Consecutive counter.

As previously stated the machine is provided with a consecutive numbering counter for registering one at each operation of the machine. Mechanism is also provided cooperating with said consecutive counter for transferring the number therefrom to type wheels 85 and type bars 89 so that said number may be printed upon a check and a detail strip, to be hereinafter described, after which, and during the restoration of the type wheels and type bars to normal position, as will be hereinafter described, the consecutive number is transferred therefrom back to the counter wheels of the consecutive counter.

The framework for the consecutive counter comprises, two plates 145 (Figs. 7 and 17) and 146 (Figs. 15 and 17), loosely mounted upon a shaft 147 carried by the frame 53 and the bracket 54. The plates 145 and 146 are tied together by means of rods 148, 149 and 150 (Fig. 7). There are four consecutive counter gears 155 (Figs. 15, 17 and 19) loosely mounted upon the rod 148 and each has secured to the side thereof a disk 156. Also secured to each gear 155 is a gear 157 and another disk 158 (Figs. 17 and 21). The disk 158 has projecting from the side thereof a pin 159 for performing the transfer from a lower order to a higher order, as will be later described. The gear 155 is arranged to be engaged with a segment 160 loosely mounted upon the hub of the gear 87 (Fig. 18). The segment 160 is provided with a notch 161 (Figs. 15 and 19) which is engaged by a bail 162 carried by parallel arms 163 and 164 (Figs. 17 and 18) loose upon the shaft 73. Secured to the side of the arm 163 is a pinion 165 loose on the shaft 73 and meshing with a segment 166 (Figs. 12, 15, 17, 18 and 22) secured to a hub 167 loose on a sleeve 168 on the shaft 147. Secured to the other end of the hub 167 is a Y shaped arm 172 carrying antifriction rollers 173 and 174 which cooperate with two plate cams 175 and 176 respectively of a double plate cam secured to the driving gear 99 on the shaft 100.

Figure 15:
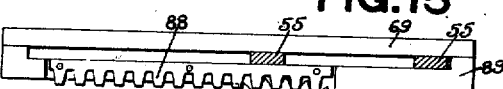
Fig. 15 is a sectional view on line 15—15 of Fig. 17 and illustrates a part of the consecutive counter, part of the printing mechanism and the elements cooperating with said counter and said printing mechanism.

The consecutive number slides 69 and type wheels 85 are locked in normal position so that no one may move said slides to destroy the home position of the said parts and thus cause the wrong consecutive number to be printed. The means for locking these elements comprises pawls 177 (Fig. 7) loose on the shaft 137. Each pawl is provided with a nose identical with the nose 141 of the pawls 140. This nose is held in engagement with the gear 86 secured to the side of the consecutive number type wheel 85 by means of a coil spring. Integral with each pawl is a portion 178 which normally engages a portion 179 (Figs. 7, 15 and 19) integral with the segment 160. From a previous description it will be remembered that the segments 160 are driven by the bail 162. It will also be remembered that the bail 162 is driven through the pinion 165 and segment 166 which is operated by the cams 175 and 176 (Fig. 15). From the above description it can be readily seen that should any one attempt to move the slides 69 the portion 178 of the pawl 177 will bind against the portion 179 integral with the segment 160 and as the segment 160 is locked in the normal position it is very obvious that the type wheels 85 and consequently the slide 69 will be locked in their normal home positions. The pawls 177 are not provided with portions like the portions 142 of the aligning pawls 140 for the reason that the setting up of the consecutive number on the type wheels 85 occurs at a different time from the setting of the amount upon the amount type wheels 80. Therefore, it was necessary to have a clearance between the pawl 177 and the bail 135 in order that said pawl may be rocked up and down over the teeth of the gear 86 when the consecutive number is being set up on the type wheels 85.

Near the beginning of the operation of the machine and as will be later described, the consecutive counter plates 145 and 146 are rocked counter-clockwise whereby the gears 155 and 157 are engaged with the segments 160 and gear 87 respectively (Figs. 15 and 19).

After the gears have been so engaged, and during the revolution of the cam plates 175 and 176, the segment 166 through the arm 172 and rollers 173 and 174 is rocked in a counter-clockwise direction thereby rotating the pinion 165 and consequently the arms 163 and 164 and also the bail 162 in a clockwise direction. This movement of the bail 162 through its engagement with the segments 160 causes said segments to be rocked clockwise, as viewed in Fig. 15, and counter-clockwise, as viewed in Fig. 19, until a portion 180 engages the mutilated portion 181 of the gears 155 which is the zero position.

Should any one of the gears 155 be set in any position other than that shown in Fig. 19, before it is engaged with the segment 160, it will during the movement of said segment as just described be rotated until it again assumes a position as illustrated in this figure whereby the gear 157, which is secured thereto, will be rotated the same distance and thereby through its engagement with the gear 87 will rotate said gear in a clockwise direction (Fig. 15) thereby rotating the type wheel 85 and moving the rack 88 to the right (as viewed in Fig. 15) thus positioning the type bar 89 commensurate with the movement of the gear 155. The movement of the type wheel 85 is also commensurate with the movement of the gear 155 thus the type on both the type bar and the type wheel are set for printing upon the detail strip and check respectively. After the gear 155 has reached its zero position the segment 160 merely slides over the mutilated portion of said gear and has no effect upon it leaving it in its zero position.

After the printing has taken place the segment 160 is given a still further movement thereby entirely disengaging the portion 180 from the gears 155. Simultaneous with the complete disengagement of the segment 160 from the gear 155, the bail 127 previously described, is rocked counter-clockwise (Figs. 15 and 16) to restore the gears 72 cooperating with the amount set-table slides to their normal position, as was previously described. The bail 127 also engages portions 131 on the gears 87 similar to the portions 131 on the gears 72 thereby restoring said gears 87 to their normal or zero position whereby the type bars 89 and the type wheels 85 are restored to their normal or zero position. The gear 87 being in engagement with the gear 157, said gear 157 will be rotated so that the amount taken therefrom will be placed back thereon. Consequently the gear 155 will be rotated back to the position in which it stood at the beginning of the operation of the machine.

After the amount has been placed back upon the consecutive counter said counter is rocked out of engagement with the gears 87 and the segments 160 in a manner to be hereinafter described. After this disengagement one is added upon the consecutive gear 157 of the lower denomination thereby leaving the counter in a position to have the consecutive number taken therefrom and transferred to the printing mechanisms during the subsequent operation of the machine.

The means for adding one upon the consecutive counter at each operation of the machine and also the means for transferring from the lower order to the higher order elements of said counter will now be described.

The means for adding one upon the consecutive counter will be taken up first. It comprises a hub 185 secured to the shaft 147 (Figs. 18 and 20), and having integral therewith a portion 186 which cooperates with a projection 187 integral with a pawl 188 loose on the stud 149. The pawl 188 has projecting laterally from the side thereof a pin 189 which cooperates with a portion 190 of a Y shaped pawl 191 (Figs. 15, 17 and 21) loose upon the stud 149 and lying in the plane of the gear 157. A portion 192 of the pawl 191 normally engages the gear 157. The pawl 188 is held in normal position by means of a pawl 193, loose on the stud 150, the nose of which engages a notch 194 in the pawl 188. The pawl 193 is held in this position by means of a spring 195 stretched between said pawl and the lower end of the Y shaped pawl 191. The spring 195 therefore retains said pawl 191 in engagement with the gear 157, as previously described.

The shaft 147 is rocked first clockwise (Fig. 15) and then counter-clockwise to normal position once during each operation of the machine by means to be hereinafter described. During the clockwise movement of said shaft the projection 186 on the hub 185 engages the portion 187 of the pawl 188 thereby rocking the said pawl counter-clockwise thereby causing the pin 189 to engage the portion 190 of the pawl 191 and rock said pawl counter-clockwise whereby the portion 192 of said pawl is disengaged from the gear 157 and a portion 196 of the pawl 191 is engaged with the gear 157 and rotates said gear clockwise a distance of approximately one-half a tooth space. Near the end of the clockwise movement of the shaft 147 and after the pawl 191 has been rocked to move the gear 157 clockwise a part of a tooth, a rod 200 carried by parallel arms 201 fast on the shaft 147, engages the portion 192 thereby rocking the pawl 191 clockwise which again engages the portion 192 with the next tooth space and completes the movement of the gear 157 which was started by the portion 196 of the pawl 191. This combined movement of the gear 157 by the two portions 196 and 192 of the pawl 191 is equal to one tooth which is the equivalent of adding one upon this consecutive counter gear of the lowest denomination. When the gear 157 passes from 9 to 0 the pin 159 (Fig. 21) carried by the disk 158 which, it will be remembered, is secured to the gear 157, engages a portion 202 (Fig. 15) of the pawl 188 thereby rocking the pawl counter-clockwise until the pawl 193 is cammed out of the notch 194 and into the notch 198 whereby the pin 189 will rest tangent to the portion 190 of the pawl 191. With the pawl 188 in this position the portion 203 thereof is in the path of movement of a transfer cam 204 secured to the shaft 147. When the shaft 147 is rotated clockwise the cam 204 engages the portion 203 and rocks said pawl still further in a counter-clockwise direction thereby rocking the pawl 191 cooperating with the next higher order gear 157, whereby this gear is rocked clockwise by the portion 196 of this pawl and then rocked still further to complete its one tooth movement when the rod 200 engages the portion 192 of the pawl 191 and rocks said pawl clockwise to normal position.

The means for rocking the shaft 147 to accomplish the feeding of the consecutive counter and also to accomplish the transferring from lower to higher order elements comprises, a pinion 205 (Fig. 22) secured to the shaft 147. Meshing with the pinion 205 is a segment 206 (Fig. 12) loose on a stud 207 carried by the frame 53. The segment 206 carries an anti-friction roller 208 cooperating with a cam race 209 formed in the side of a disk 210 secured to the gear 112 which, it will be remembered is driven by the train of gears illustrated in Fig. 10. The configuration of the cam race 209 is such that at the proper time and after the consecutive counter has been rocked out of engagement with the gears 87 and segments 160, the segment 206 is rocked counter-clockwise thereby rotating the pinion 205 and consequently the shaft 147 and transfer cams 204 thereon in a clockwise direction, as previously described, to effect the transferring from lower order to higher order elements and also for adding one upon the lower order element of the consecutive counter at each operation of the machine by means of a portion 186 of the hub 185 which is also secured to the shaft 147. The shaft 147 is rocked counter-clockwise to its normal position by the clockwise movement of the segment 206 which is effected by the cam race 209.

The totalizer.

As before stated the machine is provided with a totalizer for accumulating thereon the amounts set up by the settable slides.

The totalizer comprises five gears 215 loosely mounted on the stud 148 carried by the consecutive counter frames 145 and 146. Secured to the side of each of the gears 215 is a disk 216 similar to the disk 158 of the consecutive counter. The gears 215 are spaced laterally by means of their respective hubs 213 (Figs. 17 and 21). Each disk 216 carries a pin 217 cooperating with a pawl 218 similar to the pawl 188 of the consecutive counter and loosely mounted upon the stud 149. Cooperating with each of the gears 215 is a Y shaped pawl 219 like the pawl 191 of the consecutive counter previously described. The pawls 218 and 219 are held in their normal position by a pawl 220 loose on the rod 150, said pawl being like the pawl 193 in the consecutive counters. This pawl is held in engagement with the pawl 218 by the spring 221 stretched between said pawl and the Y shaped pawl 219.

When the totalizer gears 215 are rocked into engagement with the gears 72, as will be hereinafter described, the amount which has been set up by the movable slides on said gears is transferred therefrom to the totalizer gears 215 during the restoration of the gears 72, which has been previously described.

The means for transferring from the lower order element to a higher order element of the totalizer is exactly the same as that described in connection with the consecutive counter and therefore it is not thought necessary to repeat this description in connection with the totalizer.

The means for rocking the totalizer gears 215 and the consecutive counter gears 155 and 156 into and out of engagement with the gears 72, the segments 160 and the gears 87, respectively, will now be described. This means comprises, a lever 225 (Figs. 13 and 22) having secured thereto a hub 226 loose on the shaft 147 and connected to the hub 168 of the plate 146 by means of a mortice and tenon connection. The lever 225 carries an anti-friction roller 227 (Figs. 12 and 13) normally held in engagement with a plate cam 228, secured to the hub of the gear 99, by means of a spring 229 stretched between a stud 230 carried by the lever 225, and a stud 231 carried by the frame 53. The lever 225 is provided with a stud 224 (Fig. 13) against which normally rests the rear edge of the downwardly extending portion of a bell crank 232 pivotally mounted upon a stud 222 carried by the frame 53. A substantially horizontal arm on the bell crank 232 is provided with a projection 233 which cooperates with a pin 234 carried by the plate cam 228. The bell crank 232 is held in its normal position by means of a coiled spring 214. When the plate cam 228 is rotated clockwise (Fig. 13) it rocks the lever 225 counter-clockwise whereby the pin 224 engages a shoulder 223 on the bell crank 232 and is held in engagement therewith by means of the two springs 214 and 229. From the above description it will be seen that when the gear 99 is rotated counter-clockwise that the plate cam 228 will be rotated likewise which through its connection with the plate 146 rocks said plate and consequently the plate 145 (Fig. 7) counter-clockwise to engage the consecutive counter gears and the totalizer gears with the gears 72 and 87 respectively which engagement is maintained by the stud 224 and shoulder 223. During the latter part of the rotation of the cam 228 the pin 234 thereon engages the portion 233 of the bell crank 232 thereby rocking said bell crank counter-clockwise and causing its shoulder 223 to be disengaged from the pin 224 whereby the spring 229 rocks the lever 225 clockwise thereby disengaging the consecutive counter gears and the totalizer gears from the gears 72 and 87 respectively. After the pin 234 has passed the projection 233 the spring 214 returns the bell crank 232 to its normal position against the stud 224.

Printing mechanism.

The mechanism for printing the date, consecutive number and amount of each transaction upon a record strip and upon a check, and also means whereby the said check is advanced one after each print and means for feeding the check and extruding it from the machine will now be described, the detail strip and mechanism therefor being taken up first. A lever 235 secured to a sleeve 236 (Fig. 12) is mounted on a stud 237 carried by the frame 53. The left hand portion of the lever 235 has integral therewith a horizontally extending bail 238 having secured thereto a block 239 cut away to receive a resilient platen 240 (Figs. 3 and 7). Loosely mounted upon the shaft 81 (Figs. 12 and 23) is a lever 241 carrying an anti-friction roller 242 which cooperates with a cam race 243 formed in the side of a disk 244 secured to the driving gear 96. The end of the lever 241 is bifurcated at 245 to receive a stud 246 carried by the lever 235.

From the above description it is clear that when the gear 96 is rotated clockwise the disk 244 will receive said rotation and thereby cause the lever 241 through the cam race 243 and roller 242, to be rocked first clockwise and then counter-clockwise.

By the movement of the lever 241, as just described, the lever 235 will be rotated first in a counter-clockwise direction, then in a clockwise direction and finally rocked slightly counter-clockwise again to normal position. The first counter-clockwise rotation of the lever 235 causes the platen 240 to be moved downward and away from the type 67 and type bars 89 so that an ink roll, to be hereinafter described, may be operated to ink the type which have been set for printing, after which the lever 235 is moved clockwise thereby forcing the platen 240 against the type to take an impression therefrom upon the detail strip, to be hereinafter described. After the impression has been taken the lever 235 is again rocked slightly in a counter-clockwise direction thereby relieving the platen 240 from the type so that the detail strip may be fed for the subsequent operation of the machine.

The mechanism for inking the type 67 and the type bars 89 comprises, a lever 250 (Fig. 12) fast upon a shaft 251 carried by the frame 53 and the bracket 54. The lever 250 is provided with a slot 252 to receive a pin 254 carried by the portion 255 integral with the lever 235. The upper portion of the lever 250 has a hole 256 (shown in dotted lines in Fig. 7) for receiving the end of a shaft 257 carried by a lever 258 (Figs. 3 and 4) loosely mounted upon the shaft 251. Rotatably mounted on the shaft 257 is a roll 259, made of felt or any other suitable material to receive ink. Laterally extending from the lever 258 is a pin 260 (Figs. 3 and 7) which enters a hole in an arm 261 fast on the shaft 251. The pin 260 is held in the arm 261 by means of a spring pressed ball 262. Said ball and spring are carried within the arm 261 and cooperate with an annular groove (not shown) in the pin 260.

During the first counter-clockwise movement of the lever 235, as previously described, the pin 254 carried by the portion 255 of said lever, through its engagement with the slot 252 in the lever 250, causes said lever 250 to be rotated in a clockwise direction whereby the ink roll 259 passes over the type 67 and the type bars 89 (Figs. 5, 7, 12 and 15), and inks them for printing. The slot 252 in the lever 250 is so formed that the first part of the movement of the lever 235 will have no effect upon the lever 250 until the platen 240 has been lowered a sufficient distance to allow the roller 249 to pass between said platen and the type bars. Through the stud 260 and its connection with the arm 261 the lever 258 is rocked simultaneously with the rocking of the lever 250 thus keeping the ink roller 259 straight so that the type which have been positioned will be uniformly inked. During the clockwise movement of the lever 235 the levers 250 and 258 will be restored to their normal position previous to the impression of the platen against the type.

Figure 12:
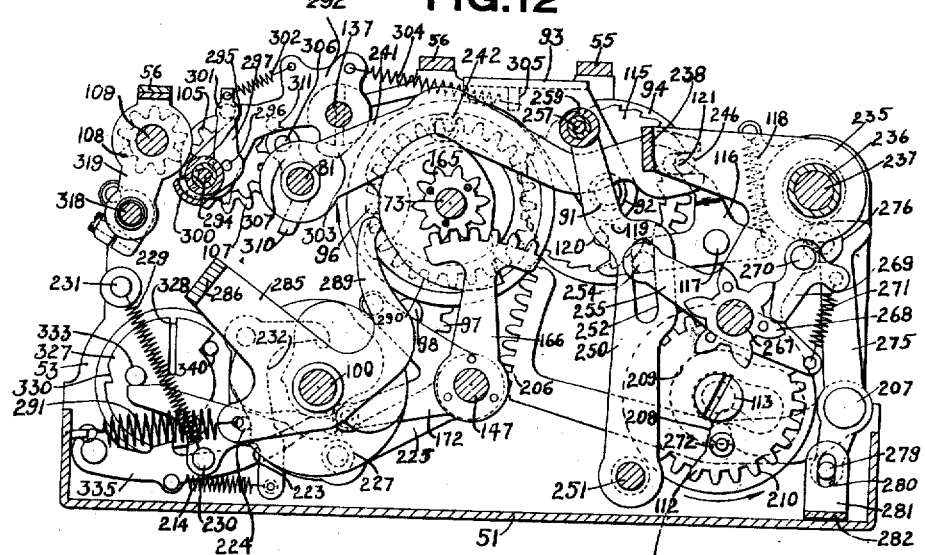
Fig. 12 is a vertical sectional view taken on line 12—12 of Fig. 4, looking in the direction indicated by the arrows.

The detail strip is fed from the supply roll 265 (Fig. 7) rotatably mounted upon the sleeve 236, forward and underneath the block 239, up and over said block and platen 240, down over the supply roll and wound upon a receiving roll 266 loose upon a stud 267 (Fig. 12). Rigidly secured to one end of the receiving roll 266 is a star wheel 268 which has cooperating therewith a pawl 269 loose upon a stud 270 carried by the lever 235. The pawl 269 is held in engagement with the star wheel 268 by a spring 271 stretched between said pawl and the extreme lower end of the lever 235.

The means for feeding the detail strip after printing comprises a pin 272 (Figs. 10 and 12) secured to the side of the gear 112. During the counter-clockwise rotation of the gear 112 the pin engages one of the points of the star wheel 268 and rotates said star wheel in a clockwise direction until the pin 272 has passed out of engagement with said wheel thereby causing the receiving roll 266 to be rotated in a clockwise direction to draw the paper from the supply roll and wind it upon said receiving roll. The amount which the paper is fed is shown by the distance between the printings illustrated on the portion of a detail strip in Fig. 9.

Due to the direction in which the paper is fed the amounts are printed one above the other instead of one below the other as is usual in the art of printing detail strips. Therefore when the total is printed, as will be hereinafter described, said total amount will be printed above the individual amounts instead of below.

Associated with the record is an autographic device comprising an angular bracket 273 (Fig. 7) secured to the bail 238 and having fastened to its substantially horizontal portion a plate 274 which is of sufficient width to be used as a table for writing upon the record strip. The cabinet 50 is provided with an opening 274 which is large enough to allow the operator to see the last printed record on the strip, with the exception of the date, and also to make any notation he may desire. Said notation is made above the consecutive number and the amount as is illustrated in Fig. 9.

In Fig. 9 is shown a portion of the record strip as printed by the machine, the second line of printing at the extreme left shows the date, the next number "135" represents the consecutive number, and the number at the right, "2.50," represents the amount. The next line of writing "Richard Roe" illustrates how the autographic feature may be employed.

The device for locking the record strip in place and for releasing the same when it is necessary to replace the supply roll is of substantially the same as that illustrated and described in the above mentioned Fuller patent, and therefore but a brief description of the same will be given herein. Loosely mounted on the stud 207 is a lever 275 (Figs. 4 and 12) having its upper end formed T shaped and carrying a stud 276 that cooperates with a groove 277 formed in the sleeve 236. The T shaped portion cooperates with a groove 278 formed in the stud 237 (Fig. 4). The lower portion of the lever 275 carries a stud 279 operating in a slot 280 in a vertically extending arm 281 of a lever 282 pivotally mounted upon the base 51. A portion 283 of the lever 282 extends just through an opening (not shown) made in a door (not shown) of the cabinet 50. This door is kept locked and the key is held by the proprietor.

In order to remove the detail strip after the door of the cabinet has been removed the proprietor moves the portion 283 of the lever 282 to the right as viewed in Figs. 3 and 7 thereby rocking the lever 275 in a clockwise direction and releasing the T portion of said lever and also the stud 276 thereon from the stud 237 and sleeve 236 respectively. The proprietor may now take hold of the lever 235 and slide it and the sleeve 236 off from the stud 237, in order to remove the old detail strip from the receiving roll and place a new supply roll upon the sleeve 236 after which the lever is assembled again upon the stud 237 and the lever 282 is rocked again to the left thus rocking the lever 275 counter-clockwise and again engaging the T shaped portion and the stud 276 thereon with the notches in the stud 237 and sleeve 236, respectively, whereby the detail strip is locked in position and ready for use.

The mechanism for printing and issuing a check, a sample of which is shown in Fig. 8, comprises a lever 285 (Figs. 7, 12 and 22) loosely mounted upon the stud 100, and having integral therewith a bail 286 to which is secured a block 287 cut away to receive a resilient platen 288. The lever 285 has integral therewith a goose neck portion 289 the upper end of which is held in contact with the periphery of a plate cam 290 by a coil spring 291 stretched between the lever 285 and the vertically extending portion of the base 51. The plate cam 290 is secured to the hub of the gear 95 (Fig. 10) and driven therewith.

The contour of the plate 290 is such that when it is given a revolution it causes the lever 285 to be rocked counter-clockwise, through the engagement of said cam with the goose neck portion 289, thereby moving the platen 288 downward until the highest radial periphery of the cam is reached. It will be noticed that the periphery of the cam 290 is very abruptly broken and when this portion of the cam contacts with the goose neck portion 289 of the lever said lever will be rocked in a clockwise direction by the spring 291 which has had an extra tension placed thereon through the counter-clockwise rocking of the lever 285 by the cam 290. This clockwise movement of the lever 285 forces the platen 288 with a hammer like blow against the check strip which lies between the said platen and the type wheels whereby the date, consecutive number and the amount of the transaction will be printed upon said strip. The platen is immediately drawn away from the type wheels by the spring 291. It will be seen by referring to Fig. 12 that this spring is connected to the lever 285 so as to cause this extra movement of said lever in a counter-clockwise direction whereby the platen is moved away from the type wheels to allow the check strip to be fed after the impression has been made thereupon.

The device for inking the type wheels comprises, an arm 292 (Figs. 4 and 12) fast upon the shaft 137, and an arm 293 (Figs. 4 and 7) also fast upon said shaft. The lower end of each arm 292 and 293 is bifurcated to receive a shaft 294 on which is loosely mounted a roll 295 made of felt or other suitable material for receiving ink. Pivotally mounted on the arm 292 at 296 is an arm 297. Pivotally mounted upon arm 293 at 298 is an arm 299. The arms 297 and 299 are made integral by a bail 300 which connects them at their lower extremities. These arms are curved so that they form a bearing for the shaft 294 and hold said shaft within the bifurcated ends of the arms 292 and 293. The arms 297 and 299 are each provided with a pin 301 held in engagement with the arm 292 and the arm 293 by springs 302 stretched between the upper ends of the arms 297 and 299 and the arms 292 and 293 respectively thus insuring that the shaft and the ink roll 295 will not drop out of the bifurcated ends of the arms 292 and 293. The ink roll is held in normal position by a spring 304 stretched between the arm 292 and a pin 305 carried by the bracket 93. The arm 292 is provided with a downwardly extending portion 303 (Fig. 12) which cooperates with a pin 306 carried by a lever 307, said lever being provided with a hub 308 (Fig. 4) connected by mortice and tennon connection to a hub 309 integral with the gear 104. From the above description it will be clear that when the gear 104 is rotated in a clockwise direction, as previously described, the lever 307 will receive a clockwise rotation, whereby the pin 306 engages the portion 303 and rocks the arm 292, the shaft 137 and consequently the arm 293 in a counter-clockwise direction, a distance sufficient to carry the ink roll 295 downward so that said roll will contact with the type wheels thereby inking the same for printing. As soon as the pin 306 is disengaged from the portion 303 the spring 304 rocks the arms 292 and 293 to their normal position. If the spring 304 should fail to work an arm 310 integral with the lever 307, will strike a pin 311 carried by the arm 292 and cam said arm back to its normal position. During this movement of the arms 292 and 293 the bail 300 acts as a guard for the check strip so that it will not become smeared with ink from the roll 295.

The mechanism for printing on the check other than that which is printed by the type wheels, and for feeding the check after receiving an impression from the type wheels comprises, a cylinder 312 (Figs. 4 and 7) secured to knurled disks 313 fast upon the shaft 109. An electrotype 314 is mounted upon the cylinder 312 so that when the shaft 109 is rotated by the gear train illustrated in Fig. 10, an impression will be made upon a check strip 315. This strip is fed from a supply roll 316 loosely mounted upon the stud 100, the strip being drawn from the supply roll between the knurled disks 313 and a resilient roll 317 eccentrically mounted upon a shaft 318. This shaft 318 has bearings in a bracket 319 (Fig. 4) secured to the tie bar 56, and a vertically extending bracket 320 (Fig. 3) secured to the base 51. The roll 317 is eccentrically mounted for the purpose of adjusting the impression between it and the electrotype 314 in a manner well known in the art and fully described and illustrated in the above mentioned patent, therefore it is not thought necessary to describe the same herein. The ink roll 295 is in such a position that when the cylinder 312 is revolved the electro-type 314 will pass over the ink roll and thus be inked ready for printing upon the check. As the electro 314 contacts with the impression roller 317 the check strip 315 is extruded from the machine through an opening 321 in the cabinet 50 (Fig. 3) and may be torn off by the operator by pulling upward against a serrated plate 322 secured to said cabinet.

The portion torn off will resemble a check similar to the one in Fig. 8. The printing on the bottom is done by the type wheels and represents from left to right, the date, the consecutive number and the amount. All other printing on the check is done by the electro-type 314 while the check is being fed from the machine.

*Totalizing mechanism.*

The mechanism for manually engaging the totalizer with the actuators so that a total may be taken therefrom, and for also engaging the consecutive counter with the means for transferring the number therefrom to the printing mechanisms, and for resetting the totalizer to zero and also resetting the consecutive counter to zero comprises, a lock casing 325 (Figs. 12, 13, and 14), and a portion 326 thereof extends through the cabinet 50 (Figs. 1 and 2). A disk 327 lies against one face of the lock casing 325 and has integral therewith a sleeve (not shown) which projects in an opening (not shown) made in the lock casing 325 and its projecting portion 326. The disk 327 is provided with two oppositely arranged radial slots 328 which are adapted to receive the prongs (not shown) of a key 329 which may be inserted through the sleeve attached to the disk 327. Through this means by turning the key 329 the disk 327 may be oscillated. In the periphery of the disk 327 are two smaller notches 330 and 331 and a cut away portion 332. The disk also carries a laterally projecting stud 333 that cooperates with the extreme end 334 of the lever 225 previously described. A lever 335 loosely mounted on a stud 336 is provided with an extension 337 which normally engages the notch 331 in the periphery of the disk 327. The extreme end of the lever 335 cooperates with a pin 338 secured to the plate cam 228.

Figure 13:
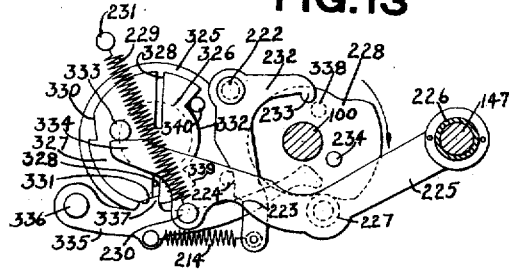
Fig. 13 is a detail view of the lock and its cooperating parts for engaging the totalizer with the actuating mechanism during totaling operations.
Figure 14:
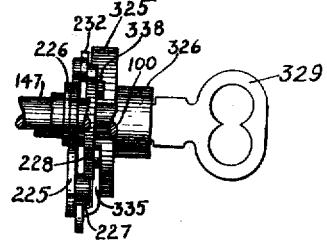
Fig. 14 is an end elevation of the mechanism illustrated in Fig. 13 and also shows the removable key for operating the same.

To take a total of the amount which has been accumulated upon the register the operator inserts the key 329 in the lock casing 325 far enough so that the ends of said key engage in the radial slots 328 of the disk 327 (Figs. 13 and 14). By means of the key 329 the disk 327 is given a onefourth turn in a counter-clockwise direction thereby causing the pin 333 to rock a lever 225 in a counter-clockwise direction. It will be remembered that the frames 145 and 146 which carry the totalizer and the consecutive counter are secured to the lever 225 and therefore when said lever is rocked by the engagement of the pin 333 with the end 334 of said lever the totalizer and consequently the consecutive counter will be rocked into engagement with the gears 72 and 87 respectively. The movement of the disk 327 as just described rocks the lever 225 counter-clockwise and moves until the notch 330 is opposite the portion 337 of said lever whereby said portion engages the notch 330 in the disk 327. With the lever 335 in engagement with the notch 330 the totalizer gears and the consecutive counter gears are in engagement with their actuating parts as the stud 333 which rocks the lever 225 is secured to the disk 327. This also prevents the key 329 from being withdrawn from the lock casing until the totalizer and the consecutive counter have been disengaged from their actuating members and the disk 327 has been returned to its normal position. When the disk 327 is moved counter-clockwise by the key 329, a shoulder 339 of the cut away portion 332 engages the rear edge of the bell crank 232 thereby rocking said bell crank counter-clockwise and rendering it ineffective. It will be remembered that during adding operations this bell crank 232 controls the disengagement of the totalizer and the consecutive counter and since during total taking operation the disengagement of the totalizer and the consecutive counter must occur at a different time and through different means the function of this lever must necessarily be crippled. To prevent the key 329 from being turned too far the cut away portion 332 is of such a length that its shoulder 339 engages a pin 340 fast in the lock casing 325 thereby stopping the disk 327 at the proper position so that the notch 330 therein may be engaged by the portion 337 of the lever 335.

After the key has been placed in the lock and given a one-quarter turn, as above described, the operator inserts a suitable operating element in the hole 61 of the amount slides opposite the characters "9" on said slides and moves them forward until they come to a stop.

In adding operations it will be remembered that these slides are positioned before the totalizer is thrown into engagement with the actuators whereas in totalizing operations the totalizer is rocked into engagement with the gears 72 before the slides are manipulated. Therefore when said slides are moved forward the totalizer gears 215 and their associated disks 216 will be rotated until the pin 217 carried thereby engages the upper side of the portion 202 of the pawls 218, said pawls acting as a stop for said disks and gears, this being the zero position of the totalizer. When the totalizer gears have reached this position the amount which was thereupon will have been, through the gears 72, transferred to the amount type wheels and also the type on the lower portions of the settable slides.

The crank handle is turned and the machine is operated in the usual manner thereby taking the consecutive number from the consecutive counter and transferring it through the gears 87 to the consecutive number type wheels and to the consecutive number type bars from which an impression is made upon the check and the detail strip respectively. Immediately after the printing has taken place the pin 338 engages the extreme end of the lever 335 and rocks said lever counter-clockwise to release its portion 337 from the notch 331. Immediately upon this disengagement the spring 229 rocks the lever 225 clockwise and thereby disengages the totalizer and the consecutive counter from the gears 72 and 87 respectively and restores the disk 327 to its normal position so that the key may be removed from the lock. The restoring device for the gears 72 and 87 is operated immediately after the totalizer and the consecutive counter have been disengaged thereby restoring the settable slides, the type bars 89 and all of the type wheels to their normal position. It will be remembered that during adding operations the consecutive number is put back upon the consecutive counter where as during totalizing operations the consecutive counter is rocked out of engagement before the restoring of the gears 87 therefore the consecutive number which was taken from the consecutive counter and put upon the type wheels and printed at the time the total was printed will not be put back upon the consecutive counter, the counter remaining at zero after total taking operations.

Operation.

A brief summary of the operation of the machine will now be given, it being assumed, for example, that the machine described herein is being used by an insurance collector.

The operator moves the amount slides forward until the amount collected has been set thereon. The date is also set in a like manner. The movement of the slides rotates the gears 72 and 75 to set up the amount type wheels and the date type wheels respectively, commensurate with the movement of said slides. The movement of said slides also positions the type bars on the lower portion thereof. The remaining functions of the machine are performed by turning the operating handle 90 one complete revolution. During the revolution of this handle the train of gears illustrated in Fig. 10 are each given one complete revolution in the direction indicated by the arrows.

After the type wheels and the settable slides have been set and during the first part of the movement of the handle said type wheels are aligned so that they will be ready for printing after which an impression is taken from the type bars by the platen 240 and from the type wheels by the platen 288 upon the detail strip and the check strip respectively, after which the detail strip is adjusted by means hereinbefore described and the check strip is extruded from the machine. During the extrusion of the check it receives an impression from the electro-type 314. Just before the printing takes place the segments 160 are operated and transfer the number from the consecutive counter to the type wheels and to the type bars. After the printing has taken place the bail 127 is operated to engage the portions 131 of the gears 72 and 87 and restore them to their normal positions whereby the amount as set up by the collector upon the amount slides is put upon the totalizer and the number taken from the consecutive counter is transferred from the type bars and type wheels back upon the consecutive counter after which one is added to the said counter thereby leaving it in a position for a subsequent operation of the machine. After the restoring of the totalizer actuators and after the consecutive number has been transferred back to the consecutive counter again the totalizer and the consecutive counter are rocked out of engagement. If any of the totalizer wheels have passed from 9 to 0 the transfer mechanism which is operated by the cams 204 on the shaft 147 is now operated and transfers from the lower order to the higher order. Should there have been no passing from 9 to 0 of any of the totalizer wheels the transfer cams 204 will simply rotate idly and have no effect whatever upon the pawls 218.

During the time the transfer is taking place the bail 127 is restored to its normal position. The check strip is torn off and resembles a check, a sample of which is shown in Fig. 8.

*Modification for printing on an inserted slip.*

Figure 24:
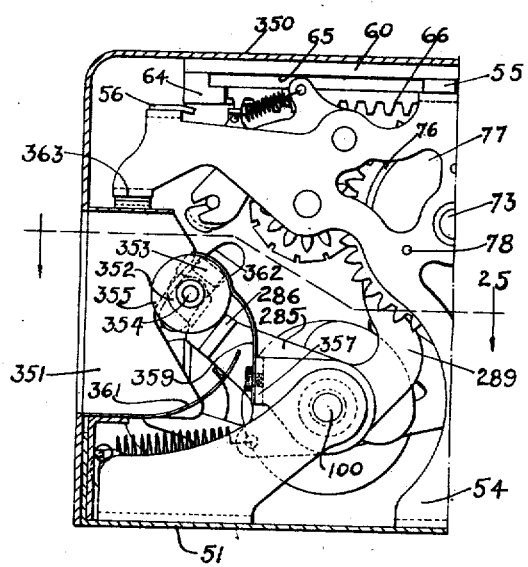
Fig. 24 is a side elevation with parts in section illustrating a part of the improved registering mechanism, having elements removed and others substituted therefor thereby showing a modified form of the invention whereby the machine is adapted to print upon inserted slips or other papers.
Figure 25:
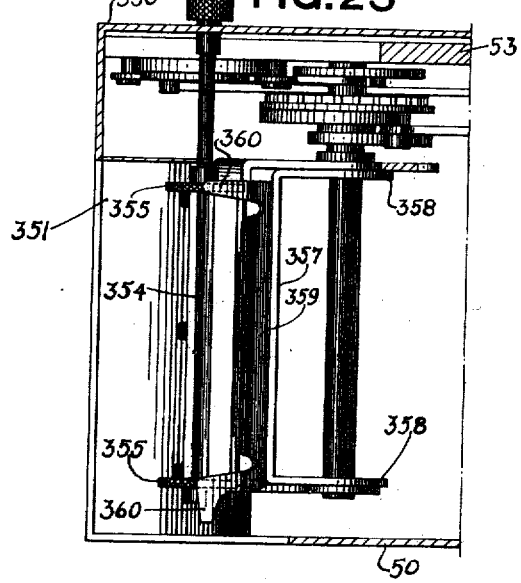
Fig. 25 is a horizontal sectional view taken on the line 25—25 of Fig. 24 looking in the direction indicated by the arrows and illustrates a part of the mechanism for manually feeding the slip so that more than one print may be made thereon if desired and said printing will be properly spaced.

The machine may be adapted to print upon an inserted slip or other paper instead of using a check as previously described. When these functions are to be performed the mechanism is enclosed in a different cabinet 350 (Figs. 24 and 25) which is cut away at 351 to receive the slip which is to be printed upon. Secured to the regular bail 286 is a block 352 carrying a resilient platen 353.

Rotatably mounted in the block 352 is a shaft 354 having secured thereto two knurled wheels 355 and a knurled knob 356. Secured to a bail 357 carried by parallel arms 358 fast on the stud 100, is a curved plate 359 having two extending fingers 360 (Fig. 25) which are normally in engagement with the knurled disks 355. To insert a slip in the machine the operator guides the slip against the curved portion 361 (Fig. 24) of the cabinet and forces it upward until it strikes the point of engagement of the portions 360 of the plate 359 with the knurled disks 355. He then grips the knurled knob 356 and turns said knob and consequently the knurled disks 355 and feeds the paper to the position in which he wishes to print. The machine is now operated in the manner substantially the same as that previously described and the platen 353 is made to carry the inserted slip against the type wheels so that an impression may be made therefrom upon said slip. If another print is desired upon the same slip the operator need not remove the slip from the machine but merely turns the knob 356 thereby feeding the slip until the desired position for printing has been reached. The cabinet is provided with a clearance slot 362 for the shaft 354 as said shaft is carried forward with the platen at the time of taking an impression.

Since no check is to be issued various elements provided to perform these functions in the machine previously described may be omitted when an inserted paper is printed upon. These elements are, referring to Figs. 3, 4, 7 and 12, the shaft 109 and all parts thereon, the bracket 320, the gears 107 and 108 (Fig. 10), and the check roll 316. The printing upon the slip includes the date, the consecutive number and the amount of the transaction.

The bracket 54 has been slightly changed near the left hand end and a portion of the cabinet attached thereto as shown at 363.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of manipulative devices, a main operating mechanism, a totalizer, actuators therefor operated by the manipulative devices, a consecutive counter, actuators therefor, printing mechanism, means interposed between said printing mechanism and said consecutive counter and operated by the main operating mechanism for transferring the consecutive number from the consecutive counter to the printing mechanism, and a member for restoring a portion of said means to normal position thereby transferring said number back upon the consecutive counter and for simultaneously restoring the totalizer actuators to normal position, the remaining portion of said means being restored to normal position by the main operating mechanism.

2. In a machine of the class described, the combination of manipulative devices, a totalizer, actuators therefor operated by said manipulative devices, a consecutive counter, actuators therefor, printing mechanism, means adapted to be engaged with said consecutive counter for transferring the number therefrom to the printing mechanism on every operation of the machine, means for engaging the totalizer with its actuators and simultaneously engaging the consecutive counter with said first mentioned means, and a member cooperating with said first mentioned means for transferring the consecutive number from the printing mechanism back upon the consecutive counter.

3. In a machine of the class described, the combination of a main operating mechanism, a consecutive counter, actuators therefor, printing mechanism, a member adapted to be engaged with said counter and operated by the main operating mechanism for reversely rotating the counter to zero on every operation of the machine, a second member adapted to be engaged with said counter for transferring the number therefrom to the printing mechanism when the counter is reversely rotated, and means for engaging and disengaging the counter with said members.

4. In a machine of the class described, the combination of a consecutive counter, actuators therefor, printing mechanism, means for reversely rotating the counter to zero on every operation of the machine, other means interposed between said counter and said printing mechanism for transferring the number from the counter to the printing mechanism when the counter is reversely rotated, and a member for operating said other means for transferring said number from the printing mechanism back upon said counter.

5. In a machine of the class described, the combination of a consecutive counter, actuators therefor, a rotating printer, a reciprocating printer, a rotating member engaging both of said printers, means for reversely rotating the consecutive counter to zero whereby the number thereon is transferred to both of said printers through the medium of said rotating member, and a member engaging said rotating member for moving said printers to normal position and thereby transferring the number therefrom back upon said consecutive counter.

6. In a machine of the class described, the combination of a main operating mechanism, a consecutive counter, actuators therefor, two printing mechanisms, means operated by the main operating mechanism on every operation of the machine for reversely rotating the consecutive counter to zero when said counter is in engagement therewith, a rotating member engaging said printing mechanisms and operated by the consecutive counter when said counter is reversely rotated to zero to transfer the number from the counter to the printing mechanisms, means operated by the main operating mechanisms for operating said rotating member to return the printing mechanisms to normal position and thereby replace the number back upon the consecutive counter, and means for engaging and disengaging said consecutive counter with said first mentioned means and said rotatable member.

7. In a machine of the class described, the combination of a main operating mechanism, a consecutive counter, actuators therefor, a printing mechanism, a mutilated gear secured to said counter, a rocking member operated by the main operating mechanism for operating said gear to rotate said counter to zero, a rotating member intermediate the printing mechanism and counter and operated by the counter for transferring the number to the printing mechanism, and means operated by the main operating mechanism for operating the rotatable member for transferring the number from the printing mechanism back to the consecutive counter.

8. In a machine of the class described, the combination of manipulative means, a totalizer, actuators therefor, a consecutive counter, actuators therefor, printing mechanism, a rocking member for rotating the counter to zero on every operation of the machine, a rotatable member connected to the printing mechanisms and operated by the counter to transfer the number therefrom to the printing mechanisms when the counter is rotated to zero, and means common to the totalizer actuators and the rotatable member and operating the actuators to accumulate an amount on the totalizer and operating the rotatable member to restore the number upon the consecutive counter.

9. In a machine of the class described, the combination of a main operating mechanism, manipulative devices, a totalizer, actuators therefor operated by said devices, a consecutive counter, actuators therefor, printing mechanism, means operated by the main operating mechanism and adapted to be engaged with said consecutive counter for transferring the number therefrom to the printing mechanism on every operation of the machine, means for engaging the totalizer with its actuators and simultaneously engaging the consecutive counter with the first mentioned means, and a member operated by the main operating mechanism for cooperating with said first mentioned means for transferring the consecutive number from the printing mechanism back upon the consecutive counter, and for returning said totalizer actuators to zero position.

10. In a machine of the class described, the combination of a main operating mechanism, a consecutive counter, actuators therefor, a rock shaft operated by the main operating mechanism, a member carried by said shaft, means interposed between said member and the actuator and operated by the member for moving the actuator to partially advance the counter, and means carried by said shaft and adapted to engage the actuator and move the actuator to complete the movement of the counter.

11. In a machine of the class described, the combination of a main operating mechanism, a consecutive counter, actuators therefor, printing mechanism, a member adapted to be engaged by said counter and operated by the main operating mechanism for reversely rotating the counter to zero on every operation of the machine, a second member adapted to be engaged by the counter for transferring the number therefrom to the printing mechanism when the counter is reversely rotated, a bail operated by the main operating mechanism and adapted to engage said second member for transferring the number from the printing mechanism to the consecutive counter, and means for engaging and disengaging the counter with said members.

12. In a machine of the class described, the combination of a main operating mechanism, a consecutive counter, actuators therefor, printing mechanism, a member adapted to be engaged with said counter and operated by the main operating mechanism for reversely rotating the counter to zero on every operation of the machine, a second member adapted to be engaged with said counter for transferring the number therefrom to the printing mechanism when the counter is reversely rotated, means for engaging the counter with said members, means for disengaging the counter from said members, and a bail adapted to engage and move said second member for moving the printing mechanism to zero position after said counter has been disengaged from said members thereby leaving the counter at zero.

13. In a machine of the class described, the combination of a totalizer, a member to stop the highest order totalizer element in the zero position during totalizing operations, a consecutive counter, an actuator therefor, a rock shaft having a projection thereon for operating said member to move the actuator to partially advance the consecutive counter, and means carried by said rock shaft and adapted to engage the actuator and move it to complete the movement of the consecutive counter.

14. In a machine of the class described, the combination of a main operating mechanism, a consecutive counter, actuators therefor, printing mechanism, an oscillating member operated by the main operating mechanism, means secured to the consecutive counter and operated by said oscillating member when in engagement therewith to rotate the counter to zero, a rotatable member operated by the counter when in engagement therewith and when said counter is being rotated to zero, for transferring the number from said counter to the printing mechanism, a rocking bail operated by the main operating mechanism and adapted to engage said rotatable member and move said member to transfer the number from the printing mechanism back to the consecutive counter, and means for engaging and disengaging the consecutive counter and said means carried by the counter with the rotatable member and the oscillating member respectively.

15. In a machine of the class described, the combination of a main operating mechanism, a consecutive counter, a printing mechanism, a member adapted to be engaged with said counter and operated constant extents by said operating mechanism to rotate the counter to zero, and means for connecting the counter with the printing mechanism to adjust the latter as the counter is turned to zero.

16. In a machine of the class described, the combination of a totalizer, a consecutive counter, printing mechanism for printing the amounts on said totalizer and consecutive counter, manipulative means for establishing connections between said counter and totalizer and said printing mechanism, manipulative means for adjusting the printing mechanism commensurate with the amount in the totalizer, an operating means, and means actuated by said operating means for adjusting the printing mechanism commensurate with the amount in the counter.

In testimony whereof I affix my signature.

BERNIS M. SHIPLEY.